(12) United States Patent
Gerrard (10) Patent No.: US 9,702,218 B2
(45) Date of Patent: Jul. 11, 2017

(54) USE OF ELASTOMERS TO PRODUCE GELS FOR TREATING A WELLBORE

(75) Inventor: Donna Gerrard, Aberdeen (GB)

(73) Assignee: M-1 Drilling Fluids U.K. Ltd., Aberdeen (GB)

(*) Notice: Subject to any disclaimer, the term of this patent is extended or adjusted under 35 U.S.C. 154(b) by 398 days.

(21) Appl. No.: 13/515,032

(22) PCT Filed: Dec. 13, 2010

(86) PCT No.: PCT/GB2010/052075
§ 371 (c)(1),
(2), (4) Date: Jan. 24, 2014

(87) PCT Pub. No.: WO2011/070375
PCT Pub. Date: Jun. 16, 2011

(65) Prior Publication Data
US 2014/0144637 A1 May 29, 2014

(30) Foreign Application Priority Data
Dec. 11, 2009 (GB) .................................. 0921711.8

(51) Int. Cl.
*E21B 33/138* (2006.01)
*C09K 3/22* (2006.01)
(Continued)

(52) U.S. Cl.
CPC .............. *E21B 33/138* (2013.01); *C09K 3/22* (2013.01); *C09K 8/035* (2013.01); *C09K 8/512* (2013.01);
(Continued)

(58) Field of Classification Search
CPC .......... C09K 3/22; C09K 8/035; C09K 8/512; C09K 8/60; C09K 17/30
(Continued)

(56) References Cited

U.S. PATENT DOCUMENTS 4,148,772 A  4/1979  Marchetti et al.
4,637,956 A  1/1987  Das et al.
(Continued)

FOREIGN PATENT DOCUMENTS

WO  2008134359 A1  11/2008
WO  2009091909 A2  7/2009

OTHER PUBLICATIONS

International Preliminary Report on Patentability of PCT Application Serial No. PCT/GB2010/052075 dated Jun. 12, 2012, 7 pages.

*Primary Examiner* — Silvana Runyan
(74) *Attorney, Agent, or Firm* — Sara K. M. Hinkley (57) ABSTRACT

A method of treating an earthen formation that includes introducing a first amount of a first blocked isocyanate in a liquid phase into the earthen formation; introducing a second amount of a second blocked isocyanate in a liquid phase into the earthen formation; the second blocked isocyanate group having a lower unblocking temperature than the first blocked isocyanate group; introducing at least one active hydrogen compound into the earthen formation; and contacting the first and second blocked isocyanates and the active hydrogen compound to form an elastomeric gel. The combination of two blocked isocyanates provides a synergistic effect so that the curing time can be optimised in a manner unexpected from the properties of the individual blocked isocyanates.

20 Claims, 2 Drawing Sheets

(51) Int. Cl.
  *C09K 8/035* (2006.01)
  *C09K 8/512* (2006.01)
  *C09K 8/88* (2006.01)
  *C09K 17/30* (2006.01)
  *C09K 8/92* (2006.01)

(52) U.S. Cl.
  CPC ............... C09K 8/887 (2013.01); C09K 8/92 (2013.01); C09K 17/30 (2013.01)

(58) Field of Classification Search
  USPC .............................. 166/300, 305.1, 285, 400
  See application file for complete search history.

(56) References Cited

U.S. PATENT DOCUMENTS

| | | |
|---|---|---|
| 4,746,754 A | 5/1988 | Otterbacher et al. |
| 4,767,829 A | 8/1988 | Kordomenos et al. |
| 4,870,141 A | 9/1989 | Kordomenos |
| 4,976,833 A | 12/1990 | Debroy et al. |
| 5,108,458 A | 4/1992 | Marumoto et al. |
| 5,453,536 A | 9/1995 | Dai et al. |
| 5,559,064 A | 9/1996 | Tsuchinari et al. |
| 6,288,176 B1 | 9/2001 | Hsieh et al. |
| 7,157,527 B2 | 1/2007 | Kuntimaddi et al. |
| 2002/0028932 A1 | 3/2002 | Loontjens et al. |
| 2003/0004282 A1 | 1/2003 | Kamikado et al. |
| 2003/0194635 A1 | 10/2003 | Mulligan |
| 2004/0236021 A1 | 11/2004 | Faecke et al. |
| 2005/0187314 A1 | 8/2005 | Anderson et al. |
| 2006/0122357 A1 | 6/2006 | Faecke et al. |
| 2006/0148391 A1 | 7/2006 | Ono et al. |
| 2006/0281854 A1 | 12/2006 | Imamura et al. |
| 2007/0009750 A1 | 1/2007 | Ito et al. |
| 2007/0023288 A1 | 2/2007 | Kuwano et al. |
| 2010/0197528 A1* | 8/2010 | Sanders ................ C09K 8/58 507/207 |
| 2010/0282470 A1* | 11/2010 | Alberty et al. ............ 166/308.1 |

* cited by examiner

USE OF ELASTOMERS TO PRODUCE GELS FOR TREATING A WELLBORE

BACKGROUND OF INVENTION

Field of the Invention

Embodiments disclosed herein relate generally to elastomer compositions used in downhole applications.

Background Art

Lost circulation is a recurring drilling problem, characterized by loss of drilling mud into downhole formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighbouring or inter-bedded low permeability rocks, such as shales, maintain their pore pressure. This can make the drilling of certain depleted zones impossible because the mud weight required to support the shale exceeds the fracture resistance of the sands and silts.

Other situations arise in which isolation of certain zones within a formation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

During the drilling process muds are circulated downhole to remove rock as well as deliver agents to combat the variety of issues described above. Mud compositions may be water or oil-based (including mineral oil, biological, diesel, or synthetic oils) and may comprise weighting agents, surfactants, proppants, and gels. In attempting to cure these and other problems, crosslinkable or absorbing polymers, loss control material (LCM) pills, and cement squeezes have been employed. Gels, in particular, have found utility in preventing mud loss, stabilizing and strengthening the wellbore, and zone isolation and water shutoff treatments.

In attempting to cure these and other problems, crosslinkable or absorbing polymers, loss control material (LCM) pills, and cement squeezes have been employed, each of which may include materials such as lignins and lignosulfonates, as well as lignin and lignosulfonate gels.

In many wells, water-based and oil-based muds are both used. Water-based muds are generally used early in the drilling process. Later, oil-based muds are substituted as the well gets deeper and reaches the limit of the water-based muds due to limitations such as lubricity and well bore stabilization.

There is a continuing need for the development gels for downhole applications that are relatively environmentally safe, and that may formed to be compatible with oil-based muds.

WO2008 134359 describes treating an earthen formation that includes introducing at least one blocked isocyanate in a liquid phase into the earthen formation; introducing at least one active hydrogen compound into the earthen formation; and contacting the blocked isocyanate and the active hydrogen compound form an elastomeric gel is disclosed.

The choice of isocyanate and blocking group affords a large degree of choice and the particular isocyanate and blocking group chosen depends on the earthen formation conditions to which the blocked isocyanate is added. This method works well in practice although improved choice and control over the formation of the gel in practice are always sought.

SUMMARY OF INVENTION

In one aspect, embodiments disclosed herein relate to a method of treating an earthen formation that includes
introducing a first amount of a first blocked isocyanate in a liquid phase into the earthen formation;
introducing a second amount of a second blocked isocyanate in a liquid phase into the earthen formation;
the second blocked isocyanate group having a lower unblocking temperature than the first blocked isocyanate group;
introducing at least one active hydrogen compound into the earthen formation; and contacting the first and second blocked isocyanates and the active hydrogen compound to form an elastomeric gel.

In another aspect, embodiments disclosed herein relate to a method of treating an earth formation that includes introducing a first blocked isocyanate in a liquid phase into the earthen formation, and a second blocked isocyanate in a liquid phase into the earthen formation; introducing at least one amine into the earthen formation; and contacting the blocked isocyanate and the amine to form an elastomeric gel.

Preferably the first and second blocked isocyanates are mixed together before being introduced into the earthen formation. Preferably therefore they are introduced simultaneously.

The relative amounts of the first and second isocyanates may be varied, although for certain embodiments the first amount is greater than the second amount. Preferably the second amount is 5-25 wt %, more preferably 10-20 wt % of the total amount of the blocked isocyanates.

Other aspects and advantages of the invention will be apparent from the following description and the appended claims.

Elastomeric Gels

A gel is a colloidal system in which an extended porous network of interconnected molecules spans the volume of a liquid medium. Although gels appear to be solid, jelly-like materials, by weight, gels are mostly liquid. The elastomeric gels of the present disclosure may be used in downhole applications as a component of drilling mud and may be preformed and pumped downhole. Alternatively, reactants or components may be introduced simultaneously or sequentially downhole forming the gel in situ. For example, the liquid components may be pumped into a wellbore which traverses a loosely consolidated formation, and allowed to cure, thereby forming a polymeric network which stabilizes the formation and the wellbore as a whole. Depending on the particular application, the gel precursors may be selected such that the gels may be non-aqueous, aqueous formed from an aqueous emulsion.

Elastomers are amorphous polymers existing above their glass transition temperature, so that considerable segmental motion is possible. At ambient temperatures, they are thus relatively soft and deformable. Such properties are derived from the structure of the compositions, long polymer chains crosslinked during curing. The elasticity is derived from the ability of the long chains to reconfigure themselves to distribute an applied stress, while the covalent cross-linkages ensure that the elastomer will return to its original configuration when the stress is removed.

There are numerous types of elastomer compositions. Among the various compositions, several types of elastomers may be formed by the reaction of an isocyanate group with a compound having an active hydrogen thereon. As known in the art, the term active hydrogen compound refers to a compound that will give up or transfer a hydrogen atom to another substance. The reaction between an isocyanate and an active hydrogen compound proceeds by an active hydrogen atom-containing nucleophillic centre attacking the electrophillic carbon atom of an isocyanate, and the active hydrogen atom being added to the nitrogen atom of the isocyanate as shown below in Eq. 1:

(1)

Among the types of elastomers which are reaction products of isocyanates includes polyurethanes and polyureas.

Polyurethanes are typically produced by the polyaddition reaction of a polyisocyanate with a polyalcohol (polyol). A polyisocyanate is a molecule containing two or more isocyanate functional groups, $R-(N{=}C{=}O)_{n\geq2}$, and a polyol is a molecule having two or more hydroxyl functional groups, $R'-(OH)_{n\geq2}$. The reaction product is a polymer containing the urethane linkage, —RNHCOOR'—, formed by the reaction between an isocyanate group and a hydroxyl group.

Polyureas are produced by the polyaddition reaction of a polyisocyanate with a polyamine. As stated above, a polyisocyanate is a molecule containing two or more isocyanate functional groups, $R-(N{=}C{=}O)_{n\geq2}$, while a polyamine is a molecule having two or more amine functional groups, $R'-(NH_2)_{n\geq2}$. The reaction product is a polymer containing the urea linkage, —RNHCNHR'—, formed by the reaction between an isocyanate group with an amine group.

For embodiments of the present invention, it is preferred to react the isocyanates with a polyamine to produce a polyurea, rather than an alcohol to produce a polyurethane.

Thus, in some embodiments, the gels are formed from isocyanates which may react with active hydrogen compounds to form an elastomeric, gelatinous structure. Additionally, in some embodiments, the formed gels may be a variety of elastomer compositions having a gelatinous structure formed downhole. Further, catalysts, accelerators, and/or retardants may optionally be added to effect or enhance gel formation although for certain preferred embodiments, a catalyst is not required. Also, additives such as stabilizers, plasticizers, adhesion promoters, and fillers may be added to enhance or tailor the gel properties.

Isocyanates

Isocyanates which form the first and second blocked isocyanates disclosed herein may independently include isocyanates, polyisocyanates, and isocyanate prepolymers. Examples of these are given herebelow and these may be used, independently, as the isocyanates for the first or second blocked isocyanates according to the present invention.

Suitable polyisocyanates include any of the known aliphatic, alicyclic, cycloaliphatic, araliphatic, and aromatic di- and/or polyisocyanates. Inclusive of these isocyanates are variants such as uretdiones, biurets, allophanates, isocyanurates, carbodiimides, and carbamates, among others.

Aliphatic polyisocyanates may include hexamethylene diisocyanate, trimethylhexamethylene diisocyanate, dimeric acid diisocyanate, lysine diisocyanate and the like, and biuret-type adducts and isocyanurate ring adducts of these polyisocyanates. Alicyclic diisocyanates may include isophorone diisocyanate, 4,4'-methylenebis(cyclohexylisocyanate), methylcyclohexane-2,4- or -2,6-diisocyanate, 1,3- or 1,4-di(isocyanatomethyl)cyclohexane, 1,4-cyclohexane diisocyanate, 1,3-cyclopentane diisocyanate, 1,2-cyclohexane diisocyanate, and the like, and biuret-type adducts and isocyanurate ring adducts of these polyisocyanate. Aromatic diisocyanate compounds may include xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluydine diisocyanate, 4,4'-diphenyl ether diisocyanate, m- or p-phenylene diisocyanate, 4,4'-biphenylene diisocyanate, 3,3'-dimethyl-4,4'-biphenylene diisocyanate, bis(4-isocyanatophenyl)-sulfone, isopropylidenebis (4-phenylisocyanate), and the like, and biuret type adducts and isocyanurate ring adducts of these polyisocyanates. Polyisocyanates having three or more isocyanate groups per molecule may include, for example, triphenylmethane-4,4', 4''-triisocyanate, 1,3,5-triisocyanato-benzene, 2,4,6-triisocyanatotoluene, 4,4'-dimethyldiphenylmethane-2,2',5,5'-tetraisocyanate, and the like, biuret type adducts and isocyanurate ring adducts of these polyisocyanates. Additionally, isocyanate compounds used herein may include urethanation adducts formed by reacting hydroxyl groups of polyols such as ethylene glycol, propylene glycol, 1,4-butylene glycol, dimethylolpropionic acid, polyalkylene glycol, trimethylolpropane, hexanetriol, and the like with the polyisocyanate compounds, and biuret type adducts and isocyanurate ring adducts of these polyisocyanates.

Other isocyanate compounds may include tetramethylene diisocyanate, toluene diisocyanate, hydrogenated diphenylmethane diisocyanate, hydrogenated xylylene diisocyanate, and trimers of these isocyanate compounds; terminal isocyanate group-containing compounds obtained by reacting the above isocyanate compound in an excess amount and a low molecular weight active hydrogen compounds (e.g., ethylene glycol, propylene glycol, trimethylolpropane, glycerol, sorbitol, ethylenediamine, monoethanolamine, diethanolamine, triethanolamine etc.) or high molecular weight active hydrogen compounds such as polyesterpolyols, polyetherpolyols, polyamides and the like may be used in embodiments disclosed herein.

Other useful polyisocyanates include, but are not limited to 1,2-ethylenediisocyanate, 2,2,4- and 2,4,4-trimethyl-1,6-hexamethylenediisocyanate, 1,12-dodecandiisocyanate, omega, omega-diisocyanatodipropylether, cyclobutan-1,3-diisocyanate, cyclohexan-1,3- and 1,4-diisocyanate, 2,4- and 2,6-diisocyanato-1-methylcylcohexane, 3-isocyanatomethyl-3,5,5-trimethylcyclohexylisocyanate ("isophoronediisocyanate"), 2,5- and 3,5-bis-(isocyanatomethyl)-8-methyl-1,4-methano, decahydronaphthathalin, 1,5-, 2,5-, 1,6- and 2,6-bis-(isocyanatomethyl)-4,7-methanohexahydroindan, 1,5-, 2,5-, 1,6- and 2,6-bis-(isocyanato)-4,7-methanohexahydroindan, dicyclohexyl-2,4'- and -4,4'-diisocyanate, omega, omega-diisocyanato-1,4-diethylbenzene, 1,3- and 1,4-phenylenediisocyanate, 4,4'-diisocyanatodiphenyl, 4,4'-diisocyanato-3,3'-dichlorodiphenyl, 4,4'-diisocyanato-3,3' methoxy-diphenyl, 4,4'-diisocyanato-3,3'-diphenyl-diphenyl, naphthalene-1,5-diisocyanate, N—N'-(4,4'-dimethyl-3,3'-diisocyanatodiphenyl)-uretdion, 2,4,4'-triisocyanatanodiphenylether, 4,4',4"-triisocyanatotriphenylmethant, and tris(4-isocyanatophenyl)-thiophosphate.

Other suitable polyisocyanates may include: 1,8-octamethylenediisocyanate; 1,11-undecane-methylenediisocyanate; 1,12-dodecamethylendiisocyanate; 1-isocyanato-3-isocyanatomethyl-3,5,5-trimethylcyclohexane; 1-isocyanato-1-methyl-4(3)-isocyanatomethylcyclohexane; 1-isocyanato-2-isocyanatomethylcyclopentane; (4,4'- and/or 2,4'-)diisocyanato-dicyclohexylmethane; bis-(4-isocyanato-3-methylcyclohexyl)-methane; a,a,a',a'-tetramethyl-1,3- and/or -1,4-xylylenediisocyanate; 1,3- and/or 1,4-hexahydroxylylene-diisocyanate; 2,4- and/or 2,6-hexahydrotoluene-diisocyanate; 2,4- and/or 2,6-toluene-diisocyanate; 4,4'- and/or 2,4'-diphenylmethane-diisocyanate; n-isopropenyl-dimethylbenzyl-isocyanate; any double bond containing isocyanate; and any of their derivatives having urethane-, isocyanurate-, allophanate-, biuret-, uretdione-, and/or iminooxadiazindione groups. Polyisocyanates may also include aliphatic compounds such as trimethylene, pentamethylene, 1,2-propylene, 1,2-butylene, 2,3-butylene, 1,3-butylene, ethylidene and butylidene diisocyanates, and substituted aromatic compounds such as dianisidine diisocyanate, 4,4'-diphenylether diisocyanate and chlorodiphenylene diisocyanate. 2,4- and/or 2,6-toluene-diisocyanate and IPDI cyclo aliphatic isocyanurate are particularly preferred options. Other isocyanate compounds are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is hereby incorporated by reference in their entirety. Isocyanates formed from polycarbamates are described in, for example, U.S. Pat. No. 5,453,536, hereby incorporated by reference herein in its entirety. Carbonate isocyanates are described in, for example, U.S. Pat. No. 4,746,754, hereby incorporated by reference in its entirety herein.

However, in order to prevent premature reaction with the active hydrogen compound, and thus gellation, or reaction with any water that may likely be present in the wellbore, the isocyanates pumped downhole for formation of an elastomeric gel are blocked isocyanates. Many isocyanate reactions are reversible, and this phenomenon allows obtaining blocked isocyanates, which regenerate the isocyanate function through heating. A generic reaction scheme for the isocyanate blocking, unblocking, and ultimate reaction with an active hydrogen compound is shown below in Eq. 2:

(2)

-continued

Blocked isocyanates are typically manufactured starting from acidic hydrogen-containing compounds such as phenol, ethyl acetoacetate and ε-caprolactam. Typical unblock temperatures range between 90 to 200° C., depending on the isocyanate structure and blocking agent. For example, aromatic isocyanates are typically unblocked at lower temperatures than those required to unblock aliphatic isocyanates. The unblocking or dissociation temperature decreases according to the following order of blocking agents: alcohols>lactams>phenols>oximes>pyrazoles>active methylene groups compounds. Products such as methylethylketoxime (MEKO), diethyl malonate (DEM) and 3,5-dimethylpyrazole (DMP) are typical blocking agents used, for example, by Baxenden Chemicals Limited (Accrington, England). DMP's unblock temperature is between 110-120° C., melting point is 106° C. and boiling point is high, 218° C., without film surface volatilization problems. Trixene prepolymers may include 3,5-dimethylpyrazole (DMP) blocked isocyanates, which may be commercially available from Baxenden Chemicals Limited.

Preferably the unblocking temperature of the first and second isocyanates are within 100° C. of each other, preferably within 60° C.

Suitable isocyanate blocking agents include active hydrogen compounds which form unstable compounds with the isocyanates at high temperatures, such as above 100° C., preferably also with a good HSE (health and safety) profile and these may include alcohols, ethers, phenols, malonate esters, methylenes, acetoacetate esters, lactams, oximes, and ureas, among others. Other blocking agents for isocyanate groups include compounds such as bisulphites, and phenols, alcohols, lactams, oximes and active methylene compounds, each containing a sulfone group. Also, mercaptans, triazoles, pyrrazoles, secondary amines, and also malonic esters and acetylacetic acid esters may be used as a blocking agent. The blocking agent may include glycolic acid esters, acid amides, aromatic amines, imides, active methylene compounds, ureas, diaryl compounds, imidazoles, carbamic acid esters, or sulfites. For example, phenolic blocking agent may include phenol, cresol, xylenol, chlorophenol, ethylphenol and the like. Lactam blocking agent may include gamma-pyrrolidone, laurinlactam, epsilon-caprolactam, delta-valerolactam, gamma-butyrolactam, beta-propiolactam and the like. Methylene blocking agent may include acetoacetic ester, ethyl acetoacetate, acetyl acetone and the like. Oxime blocking agents may include formamidoxime, acetaldoxime, acetoxime, methylethylketoxine, diacetylmonoxime, cyclohexanoxime and the like; mercaptan blocking agent such as butyl mercaptan, hexyl mercaptan, t-butyl mercaptan and the like. Acid amide blocking agents may include acetic acid amide, benzamide and the like. Imide blocking agents may include succinimide, maleimide and the like. Amine blocking agents may include xylidine, aniline, butylamine, dibutylamine diisopropyl amine and benzyl-tert-butyl amine and the like. Imidazole blocking agents may include imidazole, 2-ethylimidazole and the like. Imine blocking agents may include ethyleneimine, propyleneimine and the like. Triazoles blocking agents may include compounds such as 1,2,4-triazole, 1,2,3-benzotriazole, 1,2,3-tolyl triazole and 4,5-diphenyl-1,2,3-triazole.

Examples of suitable dicarbonylmethane blocking agents include: malonic acid esters such as diethyl malonate, dimethyl malonate, di(iso)propyl malonate, di(iso)butyl malonate, di(iso)pentyl malonate, di(iso)hexyl malonate, di(iso)heptyl malonate, di(iso)octyl malonate, di(iso)nonyl malonate, di(iso)decyl malonate, alkoxyalkyl malonates, benzylmethyl malonate, di-tert-butyl malonate, ethyl-tert-butyl malonate, dibenzyl malonate; and acetylacetates such as methyl acetoacetate, ethyl acetoacetate, propyl acetoacetate, butyl acetoacetate and alkoxyalkylacetoacetates; cyanacetates such as cyanacetic acid ethylester; acetylacetone; 2,2-dimethyl-1,3-dioxane-4,6-dione; methyl trimethylsilyl malonate, ethyl trimethylsilyl malonate, and bis(trimethylsilyl) malonate.

Malonic or alkylmalonic acid esters derived from linear aliphatic, cycloaliphatic, and/or arylalkyl aliphatic alcohols may also be used. Such esters may be made by alcoholysis using any of the above-mentioned alcohols or any monoalcohol with any of the commercially available esters (e.g., diethylmalonate). For example, diethyl malonate may be reacted with 2-ethylhexanol to obtain the bis-(2-ethylhexyl)-malonate. It is also possible to use mixtures of alcohols to obtain the corresponding mixed malonic or alkylmalonic acid esters. Suitable alkylmalonic acid esters include: butyl malonic acid diethylester, diethyl ethyl malonate, diethyl butyl malonate, diethyl isopropyl malonate, diethyl phenyl malonate, diethyl n-propyl malonate, diethyl isopropyl malonate, dimethyl allyl malonate, diethyl chloromalonate, and dimethyl chloro-malonate.

Other isocyanate blocking agents are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is incorporated herein by reference in its entirety. Further, mixtures of the above-listed isocyanate blocking agents may also be used.

In some embodiments, blocked polyisocyanate compounds may include, for example, polyisocyanates having at least two free isocyanate groups per molecule, where the isocyanate groups are blocked with an above-described isocyanate blocking agent.

Blocked isocyanates may be prepared by reaction of one of the above-mentioned isocyanate compounds and a blocking agent by a conventionally known appropriate method.

In other embodiments, the blocked isocyanates used in embodiments disclosed herein may be any isocyanate where the isocyanate groups have been reacted with an isocyanate blocking compound so that the resultant capped isocyanate is stable to active hydrogens at room temperature but reactive with active hydrogens at elevated temperatures, such as between about 65° C. to 200° C. U.S. Pat. No. 4,148,772, for example, describes the reaction between polyisocyanates and capping agent, fully or partially capped isocyanates, and the reaction with or without the use of a catalyst, and is incorporated herein by reference.

Formed blocked polyisocyanate compounds are typically stable at room temperature. When heated, for example, to 70° C. or above in some embodiments, or to 120° C., 130° C., 140° C. or above in other embodiments, the blocking agent is dissociated to regenerate the free isocyanate groups, which may readily react with hydroxyl groups.

Active Hydrogen Compounds

As described above, active hydrogen compounds such as polyols and polyamines may be reacted with an isocyanate, such as those disclosed herein, to form a polyurethane gel and polyurea gel, respectively.

Aliphatic polyols useful in preparing polyurethane gels may have a molecular weight of 62 up to 2000 and include, for example, monomeric and polymeric polyols having two or more hydroxyl groups. Examples of the monomeric polyols include ethylene glycol, propylene glycol, butylene glycol, hexamethylene glycol, cyclohexamethylenediol 1,1,1-trimethylolpropane, pentaerythritol, and the like. Examples of polymeric polyols include the polyoxyalkylene polyols (i.e., the diols, triols, and tetrols), the polyester diols, triols, and tetrols of organic dicarboxylic acids and polyhydric alcohols, and the polylactone diols, triols, and tetrols having a molecular weight of 106 to about 2000. Other examples of suitable polyols include: glycerine monoalkanoates (e.g., glycerine monostearates); dimer fatty alcohols; diethylene glycol; triethylene glycol; tetraethylene glycol; 1,4-dimethylolcyclohexane; dodecanediol; bisphenol-A; hydrogenated bisphenol A; 1,3-hexanediol; 1,3-octanediol; 1,3-decanediol; 3-methyl-1,5-pentanediol; 3,3-dimethyl-1,2-butanediol; 2-methyl-1,3-pentanediol; 2-methyl-2,4-pentanediol; 3-hydroxymethyl-4-heptanal; 2-hydroxymethyl-2,3-dimethyl-1-pentanol; glycerine; trimethylol ethane; trimethylol propane; trimerized fatty alcohols; isomeric hexanetriols; sorbitol; pentaerythritol; di- and/or tri-methylolpropane; di-pentaerythritol; diglycerine; 2,3-butenediol; trimethylol propane monoallylether; fumaric and/or maleinic acid containing polyesters; 4,8-bis-(hydroxymethyl)-tricyclo[5,2,0(2,6)]-decane long chain alcohols. Suitable hydroxy-functional esters may be prepared by the addition of the above-mentioned polyols with epsilon-caprolactone or reacted in a condensation reaction with an aromatic or aliphatic diacid. These polyols may be reacted with any of the isocyanates described above.

Aliphatic polyamines useful in preparing polyureas may have a molecular weight of 60 to 2000 and include monomeric and polymeric primary and secondary aliphatic amines having at least two amino groups. Examples include alkylene diamines such as ethylene diamine; 1,2-diaminopropane; 1,3-diaminopropane; 2,5-diamino-2,5-dimethylhexane; 1,11-diaminoundecane; 1,12-diaminododecane; piperazine, as well as other aliphatic polyamines such as polyethylenimines (PEI), which are ethylenediamine polymers and are commercially available under the trade name Lupasol® from BASF (Germany). PEIs may vary in degree of branching and therefore may vary in degree of crosslinking. LUPASOL® PEIs may be small molecular weight constructs such as LUPASOL® FG with an average molecular weight of 800 or large molecular weight constructs such as LUPASOL® SK with average molecular weight of 2,000,000. Cycloaliphatic diamines suitable for use may include those such as isophoronediamine; ethylenediamine; 1,2-propylenediamine; 1,3-propylenediamine; N-methyl-propylene-1,3-diamine; 1,6-hexamethylenediamine; 1,4-diaminocyclohexane; 1,3-diaminocyclohexane; N,N'-dimethylethylenediamine; and 4,4'-dicyclohexylmethanediamine for example, in addition to aromatic diamines, such as 2,4-diaminotoluene; 2,6-diaminotoluene; 3,5-diethyl-2,4-diaminotoluene; and 3,5-diethyl-2,6-diaminotoluene for example; and primary, mono-, di-, tri- or tetraalkyl-substituted 4,4'-diamino-diphenylmethanes. Additionally, while many diamines are listed above, tri- and tetraamines may also be used in other embodiments of the present disclosure.

In yet another embodiment the aliphatic amine may be a polyetheramine such as those commercially available under the trade name JEFFAMINE® Huntsman Performance Products (Woodlands, Tex.). For example, useful JEFFAMINE® products may include triamines JEFFAMINE®

T-5000 and JEFFAMINE® T-3000 or diamines such as JEFFAMINE® D-400 and JEFFAMINE® D-2000. Useful polyetheramines may possess a repeating polyether backbone and may vary in molecular weight from about 200 to about 5000 g/mol. In addition, hydrazino compounds such as adipic dihydrazide or ethylene dihydrazine may be used, as may also, alkanolamines such as ethanolamine, diethanolamine, and tris(hydroxyethy)ethylenediamine.

Further, in various embodiments, it may be desirable to possess additional control over the curing reaction to produce the elastomeric gel. Such control may be obtained, for example, by using less chemically reactive amine structures, such as secondary amines, amines immobilized in a molecular sieve, or other less reactive or "slower amines" that may be known in the art. Suitable secondary amines may include those supplied by Huntsman Performance Products (Woodlands, Tex.), under the JEFFAMINE® SD product family, such as JEFFAMINE® SD-401 and JEFFAMINE® SD-2001.

Catalysts

Preferred embodiments do not require a catalyst to be added and this saves on the provision of further chemicals and reduces the complexity of the operation.

Nevertheless for other embodiments, the elastomeric gel may be aided in its formation with the use of a catalyst. Suitable catalysts may include organometallic catalysts such as organic complexes of Sn, Ti, Pt, Pb, Sb, Zn, or Rh, inorganic oxides such as manganese (IV) oxide, calcium peroxide, or lead dioxide, and combinations thereof, metal oxide salts such as sodium perborates and other borate compounds, or organic hydroperoxides such as cumene hydroperoxide. In a particular embodiment, the organometallic catalyst may be dibutyltin dilaurate, a titanate/zinc acetate material, tin octoate, a carboxylic salt of Pb, Zn, Zr, or Sb, and combinations thereof.

The catalyst may be present in an amount effective to catalyze the curing of the liquid elastomer composition. In various embodiments, the catalyst may be used in an amount ranging from about 0.01 to about 10 weight percent, based on the total weight of the liquid elastomer(s), from about 0.05 to about 5 weight percent in other embodiments, and from about 0.10 to about 2 weight percent in yet other embodiments.

Additives

Additives are widely used in elastomer compositions to tailor the physical properties of the resultant polymeric gel. In some embodiments, additives may include plasticizers, thermal and light stabilizers, flame-retardants, fillers, adhesion promoters, or rheological additives. Accelerators and retardants may optionally be used to control the cure time of the elastomer. For example, an accelerator may be used to shorten the cure time while a retardant may be used to prolong the cure time. In some embodiments, the accelerator may include an amine, a sulfonamide, or a disulfide, and the retardant may include a stearate, an organic carbamate and salts thereof, a lactone, or a stearic acid.

Addition of plasticizers may reduce the modulus of the polymer at the use temperature by lowering its Tg. This may allow control of the viscosity and mechanical properties of the elastomeric gel. In some embodiments, the plasticizer may include phthalates, epoxides, aliphatic diesters, phosphates, sulfonamides, glycols, polyethers, trimellitates or chlorinated paraffin. In some embodiments, the plasticizer may be a diisooctyl phthalate, epoxidized soybean oil, di-2-ethylhexyl adipate, tricresyl phosphate, or trioctyl trimellitate.

Fillers are usually inert materials which may reinforce the elastomeric gel or serve as an extender. Fillers therefore affect gel processing, storage, and curing. Fillers may also affect the properties of the gel such as electrical and heat insulting properties, modulus, tensile or tear strength, abrasion resistance and fatigue strength. In some embodiments, the fillers may include carbonates, metal oxides, clays, silicas, mica, metal sulfates, metal chromates, or carbon black. In some embodiments, the filler may include titanium dioxide, calcium carbonate, non-acidic clays, or fumed silica. Addition of adhesion promoters may improve adhesion to various substrates. In some embodiments, adhesion promoters may include epoxy resins, modified phenolic resins, modified hydrocarbon resins, polysiloxanes, silanes, or primers. For example, Addition of rheological additives may control the flow behaviour of the compound. In some embodiments, rheological additives may include fine particle size fillers, organic agents, or combinations of both. In some embodiments, rheological additives may include precipitated calcium carbonates, non-acidic clays, fumed silicas, or modified castor oils.

Further, the incorporation of silanes may be also desirable. In some embodiments, silanes such as organosilanes and amino silanes may assist in the formation of the elastomeric gels in several ways, including, reaction with any unblocked isocyanates (either those that were originally unblocked or those that have become unblocked), which may slow reaction with an active hydrogen compound, increase bond strength and/or improve adhesion promotion.

Gel Preparation

In one embodiment, the gel is formed by mixing the elastomer with the catalyst and additives in an appropriate solvent. Solvents that may be appropriate for non-aqueous gels may comprise oil-based muds for use in downhole applications and may include mineral oil, biological oil, diesel oil, and synthetic oils. Alternatively, aqueous or water-miscible fluid may be used in aqueous gels or gels formed from an aqueous emulsion.

Depending on the particular application, it may be desirable to form an elastomeric gel downhole to consolidate or otherwise treat loose or permeable formations. Polyurea and polyurethane are particularly well suited for downhole applications because they are pumpable in their precursor states, and may form a gel in situ. In various embodiments, the elastomer precursors may be used in their neat form, may be dissolved in a solvent, or may be dispersed or emulsified in a non-miscible phase, to form an elastomeric gel downhole with an optional additive.

For example, such elastomer precursors (isocyanates and polyol or polyamine) may be simultaneously or sequentially pumped downhole to traverse a loosely consolidated formation in the wellbore.

A catalyst or other desired additives, if used, may optionally be pumped downhole to further cure the elastomers compositions to form a strongly bonded matrix that may efficiently coat the loosely consolidated formation.

The inventors of the present disclosure have discovered that such a strongly bonded matrix may effectively retain the loosely consolidated formation, therefore controlling the production of sand grains from the treated zones. This treatment may serve to strengthen the wellbore and reduce debris which may cause wear to downhole tools. Alternatively, it may also be envisioned that the gel is preformed, and introduced into the wellbore.

In further embodiments, the elastomer composition may be branched or dendritic. In yet other embodiments, combinations of any of the above listed materials to be cured may be used.

Aging Temperature

In various embodiments, the cure mechanism may be temperature dependent. Thus, some elastomers may preferentially cure at elevated temperatures such as about 60 to 100° C., while yet others may cure at higher temperatures such as 100-200° C. However, in various embodiments, the reaction temperature may determine the amount of time required for gel formation.

Time Required for Gel Formation

Embodiments of the gels disclosed herein may be formed by mixing the first and second isocyanates with an active hydrogen compound, and optionally with a catalyst. In some embodiments, a gel may form immediately upon mixing isocyanate and active hydrogen compound. In other embodiments, a gel may form within 1 minute of mixing; within 5 minutes of mixing in other embodiments; within 30 minutes of mixing in other embodiments. In some embodiments, a gel may form within 1 hour of mixing; within 8 hours in other embodiments; within 16 hours in other embodiments; within 80 hours in other embodiments; within 120 hours in yet other embodiments.

Gel Viscosity

In some embodiments, a solution of elastomer precursors may initially have a viscosity similar to that of solvent, e.g., water. A water-like viscosity may allow the solution to effectively penetrate voids, small pores, and crevices, such as encountered in fine sands, coarse silts, and other formations. In other embodiments, the viscosity may be varied to obtain a desired degree of flow sufficient for decreasing the flow of water through or increasing the load-bearing capacity of a formation. The viscosity of the solution may be varied by increasing or decreasing the amount of solvent relative to the elastomer precursors, by employing viscosifying agents, or by other techniques common in the art.

In some embodiments, the combined amount of elastomer precursors may range from 0.5 to 100 weight percent, based upon the total weight of solvent in the solution. In other embodiments, the combined amount of elastomer precursors may range from 5 to 100 weight percent, based upon the total weight of solvent in the solution; from 20 to 70 weight percent in other embodiments; from 25 to 65 weight percent in yet other embodiments. As used herein, total weight of solvent is exclusive of any additional water added with pH adjusting reagents.

Gel Hardness

The reaction of the first and second isocyanates and active hydrogen compound may produce gels having a consistency ranging from a viscous sludge to a hard gel. In some embodiments, the reaction of the first and second isocyanates and active hydrogen compound may result in a soft elastic gel. In other embodiments, the reaction may result in a firm gel and in a hard gel in yet other embodiments. The hardness of the gel is the force necessary to break the gel structure, which may be quantified by measuring the force required for a needle to penetrate the crosslinked structure. Hardness is a measure of the ability of the gel to resist to an established degree the penetration of a weighted test needle.

Hardness may be measured by using a Brookfield QTS-25 Texture Analysis Instrument. This instrument consists of a probe of changeable design that is connected to a load cell. The probe may be driven into a test sample at specific speeds or loads to measure the following parameters or properties of a sample: springiness, adhesiveness, curing, breaking strength, fracturability, peel strength, hardness, cohesiveness, relaxation, recovery, tensile strength burst point, and spreadability. The hardness may be measured by driving a 4 mm diameter, cylindrical, flat faced probe into the gel sample at a constant speed of 30 mm per minute. When the probe is in contact with the gel, a force is applied to the probe due to the resistance of the gel structure until it fails, which is recorded via the load cell and computer software. As the probe travels through the sample, the force on the probe and the depth of penetration are measured. The force on the probe may be recorded at various depths of penetration, such as 20, 25, and 30 mm, providing an indication of the gel's overall hardness.

In some embodiments, the resulting gel may have a hardness value from 10 to 100000 gram-force. In other embodiments, the resulting gel may be a soft elastic gel having a hardness value in the range from 10 to 100 gram-force. In other embodiments, the resulting gel may be a firm gel having a hardness value from 100 to 500 gram-force. In other embodiments, the resulting gel may range from hard to tough, having a hardness value from 500 to 100000 gram-force; from 1500 to 75000 gram-force in other embodiments; from 2500 to 50000 gram-force in yet other embodiments; from 5000 to 30000 gram-force in yet other embodiments. In other embodiments, the hardness of the gel may vary with the depth of penetration. For example, the gel may have a hardness of 1500 gram-force or greater at a penetration depth of 20 mm in some embodiments. In other embodiments, the gel may have a hardness of 5000 gram-force or greater at a penetration depth of 20 mm; 15,000 gram-force or greater at a penetration depth of 20 mm in other embodiments; and 25000 gram-force or greater at a penetration depth of 25 mm in yet other embodiments.

With respect to the variables listed above (i.e. temperature, time, etc.), by using the present disclosure as a guide, properties may be tailored as desired.

Elastomer Processing

Some embodiments of the elastomeric gels disclosed herein may be formed in a single component system, where the first and second isocyanates and active hydrogen compound, and optionally catalysts, additives, accelerators or retarders are premixed and may be placed or injected prior to cure. The gel times may be adjusted by the use of retarders or accelerators, or by the selection of a more or less reactive active hydrogen compound. Other embodiments of the gels disclosed herein may also be formed in a two-component system, where the components may be mixed separately and combined immediately prior to injection. Alternatively, one reagent, the first and second isocyanates or active hydrogen compound, may be placed in the wellbore or the near-wellbore region where it may then be contacted by the other reagent, either the first and second isocyanates or active hydrogen compound as required.

Applications

Embodiments of the gels disclosed herein may be used in applications including: as an additive in drilling muds; as an additive for enhancing oil recovery (EOR); as one additive in loss circulation material (LCM) pills; wellbore (WB) strengthening treatments; soil stabilization; as a dust suppressant; as a water retainer or a soil conditioner; as hydrotreating (HT) fluid loss additives, and others.

Use in Drilling Muds

Drilling fluids or muds typically include a base fluid (for example water, diesel or mineral oil, or a synthetic compound), weighting agents (for example, barium sulfate or barite may be used), bentonite clay, and various additives that serve specific functions, such as polymers, corrosion inhibitors, emulsifiers, and lubricants. A number of different muds exist, and limitations on the present invention is not intended by reference to particular types. During drilling, the mud is injected through the centre of the drill string to the drill bit and exits in the annulus between the drill string and the wellbore, fulfilling, in this manner, the cooling and lubrication of the bit, casing of the well, and transporting the drill cuttings to the surface.

The gels disclosed herein may be used as an additive in drilling mud. In some embodiments, the gels may form a filter cake or one component of a filter cake that forms along the wellbore as drilling progresses. The gels contained in the drilling fluid may be deposited along the wellbore throughout the drilling process, potentially strengthening the wellbore by stabilizing shale formations and other sections encountered while drilling. Improved wellbore stability may reduce the occurrence of stuck pipe, hole collapse, hole enlargement, lost circulation, and may improve well control.

Wellbore stability may also be enhanced by the injection of a low viscosity mixture of elastomer precursors into formations along the wellbore. The mixture may then continue to react, strengthening the formation along the wellbore upon gellation of the mixture.

In other embodiments, the gels disclosed herein may aid in lifting solid debris from tubing walls and through the tubing annulus. Hard gels circulating through the drill pipe during drilling may scrape and clean the drill pipe, removing any pipe scale, mud, clay, or other agglomerations that may have adhered to the drill pipe or drill tubing. In this manner, the drill pipe may be maintained free of obstructions that could otherwise hinder removal of drilled solids from the drill pipe during drilling.

Advantages of the present disclosure may include an elastomeric gel with excellent ability to vary the gel properties based on a variety of applications. Such elastomers display an exceptionally wide range of chemistries and physical properties. As such, the elastomer precursors and resulting elastomer may be selected to tailor the properties of the resultant elastomeric gel. Adjustable gellation times, temperatures, and physical properties of the resulting gel may be selected for a particular desired application, and in particular embodiments, gels may form at lower temperatures than typically observed for blocked isocyanates. For example, the elastomeric gel may be chosen to an appropriate hardness, or flexural or elastic moduli.

Additionally, elastomer-based systems tend to be flexible, impact resistant, exhibit exceptional bond strength and low toxicity and volatility. Further, by using blocking isocyanates, a delayed gellation may occur so as to allow for sufficient time for the reactants to permeate into the formation prior gellation.

Embodiments of the invention will now be described, by way of example only, and by comparison with examples out with the scope of the present invention; all with reference to the figures in which.

COMPARATIVE EXAMPLES

DP9C/142 is a blocked isocyanate (BI) commercially available from Baxenden Chemicals Limited and is traditionally used in the paints and coating industry. It is formed from a TDI-aromatic backbone and the blocking group is ε-Caprolcatam. The TDI-aromatic backbone is normally provided as a blend of 2,4 and 2,6 isomers.

It has an unblocking temperature in the range of 212-248 F (100-120° C.). The formulas for the backbone monomer unit (2,6 isomer) and blocking group are set out in formulas 1 and 2 respectively.

2,6-TDI
Monomer unit of a TDI backbone of DP9C/142

Formula 1

Blocking group ε-Caprolactam, used in DP9C/142

Formula 2

Various experiments were performed on DP9C/142 (and no other blocked isocyanates) but the cure times at 212 F (100° C.) were longer than the preferred cure times. Accordingly experiments were conducted with catalysts TIPA and EDA separately but the gel started to form only after around 1100-1200 minutes which remains less than the preferred cure time. A variety of other catalysts were then tried but none reduced cure times to their preferred duration. Other catalysts tried were zinc 3,3,5,5-tetramethylhexanoate, zirconium neodecanoate, 1,2 dimethyl imidazole, 1,4 dimethylpyrazole, diazobicyclo-undec-7-ene, triethanolamine, tetraethylene pentamine, magnesium oxide, triethylene tetramine, dibutyl tin dilaurate, triethylene diamine and dimethylamin-1-propylamine.

EXAMPLES

In accordance with the present invention, combinations of two blocked isocyanates (BIs) were analysed. The first combination was DP9C/142 supra with DP9B/1915. DP9B/1915 is a blocked isocyanate commercially available from Baxenden Chemicals Limited. It is formed from IPDI—cycloaliphatic backbone and the blocking group is dimethylpyrazole. It has an unblocking temperature in the range of 122-158 F (50-70° C.). The formulas for the backbone monomer unit and blocking group are set out in formulas 3 and 4 respectively.

Formula 3

-continued

Formula 4 dimethyl pyrazole(DMP)

To prepare the samples, 3.5 mls of solvent were added to 3.5 mls DPnB. The blocked isocyanates were added, hot rolled for 10 minutes at 212° F. (100° C.), then 3 g of molecular sieve, 0.5 ml of water and 1.9 mls JEFFAMINE™ T3000 (a polyetheramine available from Huntsman, www.huntsman.com) were added. The results are shown in table 1.

TABLE 1

| Sample | DP9C/142 | DP9B/1915 | Obs @ 1 hr | Obs @ 3 hrs | Obs @ 4.5 hrs | Obs @ 72.5 hrs | Hardness (g) |
|---|---|---|---|---|---|---|---|
| 1 (Comparative) | 3.1 | — | liq | liq | Liquid | set | 4584 |
| 2 | 2.5 | 0.6 | liq | liq | viscous @ 4.5 hrs | set | 4283 |
| 3 | 2 | 1.1 | set @ 50 mins | set | set | set | 4202 |
| 4 | 1.5 | 1.6 | set @ 40 mins | set | set | set | 2944 |

Figure 1:
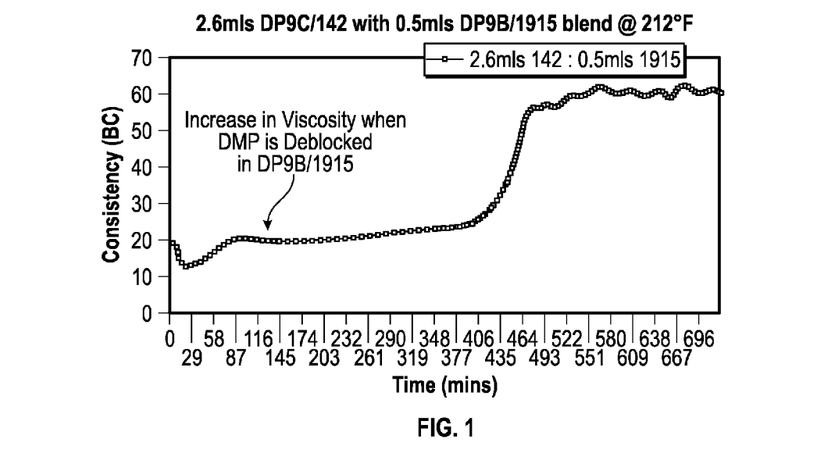
FIG. 1 is a plot showing a viscosity profile of DP9C/142 blended with DP9B/1915 showing the Increase in viscosity due to crosslinking when DP9B/1915 de-blocks.

Thus it an be seen from the figures in table 1 that the samples 2, 3 and 4 (in accordance with the present invention) all set or are viscous before the pure, comparative sample 1. As a result of the results set out in table 1, large scale testing was carried out on a combination of 2.6 ml DP9C/142 with 0.5 ml DP9B/1915 at 212 F (100° C.). The results were plotted as a viscosity profile and are shown in FIG. 1. This shows composition to start gelling at around 377 minutes, which is much less than the comparative examples, and notably do not use any catalyst to speed up the gellation time, whereas the comparative samples do, which started to gel at 1,100-1,200 minutes.

Figure 2:
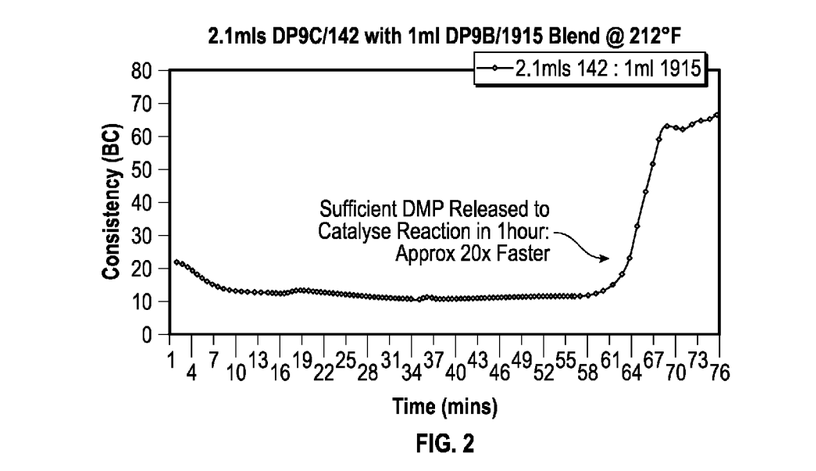
FIG. 2 is a plot showing the viscosity profile for DP9C/142 blended with a higher concentration of DP9B/1915 resulting in short cure time; and, FIG. 3 is a plot showing a viscosity profile on consistometer with DP9C/142 blended with DP9B/1915 at 212° F.

A further test was performed with an increased concentration of the lower temperature de-blocking isocyanate (DP9B/1915) compared to the higher temperature de-blocking isocyanate (DP9C/142) (1:2.1) and the composition started to gel at around 1 hour. The results were plotted as a viscosity profile and are shown in FIG. 2.

Figure 3:
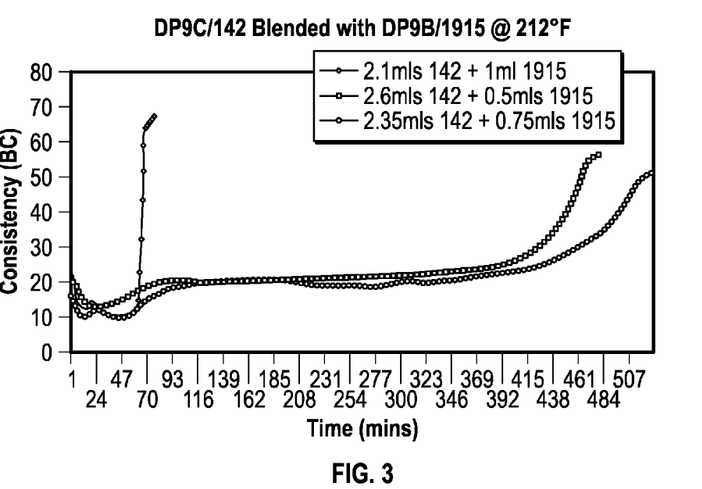

FIG. 3 shows the cure rate for three different blend compositions.

Whilst not being limited by theory, it is thought that the specific BI in this case, DP9B/1915 is releasing its de-blocking group (3,5-dimethylpyrazole) and that this blocking group is itself behaving like a catalyst (1,4-dimethylpyrazole is a catalyst used for PU systems). However further work with different blends has shown that blending of different BIs with a range of de-blocking temperatures can also give the formulator greater control over cure times. The following results illustrate this point.

COMPARATIVE EXAMPLES

Three different blocked isocyanates were analysed individually for their cure times at 248 F (120° C.). DP9B/1915 and DP9C/142 as detailed above, as well as DP9B/1916. DP9B/1916 is a blocked isocyanate commercially available from by Baxenden Chemicals Limited. It is formed from IPDI—cycloaliphatic backbone and the blocking group is eCaprolactam. It has an unblocking temperature in the range of 284-320 F (140-160° C.). The formulas for the backbone monomer unit and blocking group are set out in formula 3 and formula 2 above respectively.

Each blocked isocyanate as provided in a solvent and the composition of the solvent is given in table 2 below.

TABLE 2

Composition of single-system BI compositions

| Product | DP9B/1916 | 142 | DP9B/1915 |
|---|---|---|---|
| Blocked Isocyanate | 5 | 5 | 5 |
| Base Oil | 3.5 | 3.5 | 3.5 |

TABLE 2-continued

Composition of single-system BI compositions

| Product | DP9B/1916 | 142 | DP9B/1915 |
|---|---|---|---|
| DPnB | 1.5 | 1.5 | 1.5 |
| T3000 | 5 | 5 | 5 |
| Water | 0.5 | 0.5 | 0.5 |
| MS | 3 | 3 | 3 |

The results to determine the curing time for these isocyanates is shown in table 3 below.

TABLE 3

| Results | Obs @ 1 hr | Obs @ 2 hr | Obs @ 3 hrs | Obs @ 4 hrs | Obs @ 20 hrs |
|---|---|---|---|---|---|
| DP9B/1916 | liq | liq | liq | liq | set |
| DP9C/142 | liq | liq | liq | liq | set |
| DP9B/1915 | set | set | set | set | set |

As can be seen from table 3, the set times for DP9B/1916 and DP9C/142 respectively is at 20 hours whereas the lower temperature DP9B/1915 5is set at 1 hour.

Whilst the DP9B/1916 and DP9C/142 samples are effective for their intended downhole application, the cure time is longer than optimal and this restricts the particular applications for which it can be used.

EXAMPLES

Three combinations of the above BIs were analysed in accordance with the present invention. Their compositions are set out in table 4 below.

TABLE 4

| | combination compositions | | |
|---|---|---|---|
| Product | Combination 1 | Combination 2 | Combination 3 |
| DP9B/1916 | 2.5 | 2.5 | 0 |
| DP9C/142 | 2.5 | 0 | 2.5 |
| DP9B/1915 | 0 | 2.5 | 2.5 |
| Base Oil | 3.5 | 3.5 | 3.5 |
| DPnB | 1.5 | 1.5 | 1.5 |
| T3000 | 5 | 5 | 5 |
| Water | 0.5 | 0.5 | 0.5 |
| MS | 3 | 3 | 3 |

The various compositions were maintained as a homogenous mixture when the gels set, which in itself was surprising as they were expected to separate out into globules and set according to their individual properties. Table 5 shows the setting times for the different 5 combinations.

TABLE 5

| Results | Obs @ 1 hr | Obs @ 2 hr | Obs @ 3 hrs | Obs @ 4 hrs | Obs @ 20 hrs |
|---|---|---|---|---|---|
| Combination 1 | liq | liq | liq | liq | set |
| Combination 2 | liq | v. viscous | set | set | set |
| Combination 3 | liq | v. viscous | set | set | set |

Thus it can be seen from the above results that the combination of DP9B/1915 and DP9B/1916 (combination 2) set after 3 hours and is very viscous after 2 hours, compared with pure DP9B/1916, which is liquid at 4 hours. Similarly the combination of DP9B/1915 and DP9C/142 (combination 3) set after 3 hours and is very viscous after 2, whereas DP9C/142 itself set after up to 20 hours.

It could not be deduced from the results set out table 5 whether combination 1, a blend of DP9B/1916 and DP9C/142, set before the DP9B/1916 sample because of time restrictions in the lab. Further testing was this carried out an increased temperature, 284F (140° C.) using a composition set out in table 5 below and the results are shown further below in table 6 and table 7.

TABLE 6

| Base Oil | 3.5 |
|---|---|
| DPnB | 1.5 |
| Water | 0.5 |
| T3000 | 5 |
| MS | 3 |

TABLE 7

| Sample | DP9B/1916 | DP9C/142 | Obs @ 90 mins | Obs @ 210 mins | Obs @ 420 mins | Obs @ 480 mins | Over weekend (72 hrs) | Peak Hardness (g) | Depth (mm) |
|---|---|---|---|---|---|---|---|---|---|
| 1 | 5 | 0 | liq | liq | liq | liq | set | OS | 19.8 |
| 2 | 4 | 1 | liq | liq | liq | liq | set | 2358 | 18 |
| 3 | 3 | 2 | liq | liq | liq | viscous | set | 2100 | 20 |
| 4 | 2 | 3 | liq | liq | very viscous | set | set | 931 | 20 |
| 5 | 1 | 4 | liq | very viscous | set | set | set | 748 | 20 |
| 6 | 0 | 5 | liq | set | set | set | set | 285 | 20 |

Thus it can be seen that the combination of DP9C/142 and DP9B/1916 does set before that of DP9B/1916 itself.

Accordingly by choosing a combination of BIs, the curing period can 5 be optimised and so be used for each specific application as required. Moreover a further advantage of certain embodiments is that.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of treating an earthen formation, comprising:
   introducing a first amount of a first blocked isocyanate in a liquid phase into the earthen formation;
   introducing a second amount of a second blocked isocyanate in a liquid phase into the earthen formation;
   wherein the ratio of the volumes of the first blocked isocyanate to the second blocked isocyanate is within the range of 4:1 to 1:4;
   wherein the second blocked isocyanate has a lower unblocking temperature than the first blocked isocyanate;
   introducing at least one active hydrogen compound into the earthen formation; and
   contacting the first and second blocked isocyanates and the active hydrogen compound to form an elastomeric gel, wherein the ratio of the first amount of the first blocked isocyanate to the second amount of the second blocked isocyanate is selected such that the second amount of the second blocked isocyanate added decreases the curing time of the formed elastomeric gel.

2. The method as claimed in claim 1, wherein the first and second blocked isocyanates and the active hydrogen compound are injected simultaneously.

3. The method as claimed in claim 1, wherein the first and second blocked isocyanates and the active hydrogen compound are injected sequentially.

4. The method as claimed in claim 1, wherein the first and second blocked isocyanates independently comprise a backbone formed from at least one of a toluene diisocyanate (TDI) monomer unit and an isocyanurate (IPDI) monomer unit.

5. The method as claimed in claim 1, wherein the first blocking group's unblocking temperature is between 110-150° C.

6. The method as claimed in claim 1, wherein the unblocking temperature of the first and second blocked isocyanates are within 50° C. of each other.

7. The method as claimed in claim 1, further comprising introducing at least one organometallic catalyst into the earthen formation.

8. The method as claimed in claim 1, further comprising introducing at least one additive into the earthen formation selected from a group consisting of a plasticizer, a filler, a rheological additive, an accelerator, a retardant, and an adhesion promoter.

9. The method of claim 1, wherein the treatment is at least one selected from a group consisting of wellbore strengthening treatments, loss control material treatments, water shutoff treatments, and zonal isolation treatments.

10. The method as claimed in claim 1, wherein the first and second blocked isocyanates independently comprise a blocking group selected from a group consisting of methylethylcetoxime (MEKO), diethyl malonate (DEM) and dimethylpyrazole (DMP) and ϵ-Caprolactam.

11. The method as claimed in claim 10, wherein the first and second blocked isocyanates independently include a blocking group selected from a group consisting of dimethyl pyrazole and ϵ-Caprolactam.

12. The method as claimed in claim 1, wherein the first and second blocked isocyanates react with the active hydrogen compound to form one of polyurethanes and polyureas.

13. The method as claimed in claim 12, wherein the first and second blocked isocyanates react with the active hydrogen compound comprising an amine to form a polyureas.

14. The method as claimed in claim 1, wherein the first amount is greater than the second amount.

15. The method as claimed in claim 14, wherein the second amount is 5-45 wt % of the total amount of the first and second blocked isocyanates.

16. The method as claimed in claim 15, wherein the second amount is 10-20 wt % of the total amount of the first and second blocked isocyanates.

17. The method as claimed in claim 1, wherein the first and second blocked isocyanates are mixed together before being introduced into the earthen formation.

18. The method as claimed in claim 17, wherein the first and second blocked isocyanates and the active hydrogen compound are injected simultaneously.

19. The method as claimed in claim 17, wherein the first and second blocked isocyanates and the active hydrogen compound are injected sequentially.

20. A method of treating an earthen formation, comprising:
   introducing a first amount of a first blocked isocyanate in a liquid phase into the earthen formation;
   introducing a second amount of a second blocked isocyanate in a liquid phase into the earthen formation;
   wherein the second blocked isocyanate has at least a 10° C. lower unblocking temperature than the first blocked isocyanate;
   introducing at least one active hydrogen compound into the earthen formation; and
   contacting the first and second blocked isocyanates and the active hydrogen compound to form an elastomeric gel, wherein the ratio of the first amount of the first blocked isocyanate to the second amount of the second blocked isocyanate is selected such that the second amount of the second blocked isocyanate added decreases the curing time of the formed elastomeric gel.

* * * * *